No. 681,037. Patented Aug. 20, 1901.
T. CARNEY.
GRAIN DRILL.
(Application filed Oct. 24, 1900.)
(No Model.) 5 Sheets—Sheet 1.

No. 681,037. Patented Aug. 20, 1901.
T. CARNEY.
GRAIN DRILL.
(Application filed Oct. 24, 1900.)
(No Model.) 5 Sheets—Sheet 3.

Witnesses:
Carl H. Noe.
C. Theobald.

Thomas Carney,
Inventor.
By R. J. McCarty,
his Attorney.

THE NORRIS PETERS CO., PHOTO-LITHO., WASHINGTON, D. C.

No. 681,037. Patented Aug. 20, 1901.
T. CARNEY.
GRAIN DRILL.
(Application filed Oct. 24, 1900.)
(No Model.) 5 Sheets—Sheet 4.

Witnesses:
Carl H. Noe.
C. Theobald.

Thomas Carney,
Inventor.
By R. J. McCarty,
his Attorney.

No. 681,037. Patented Aug. 20, 1901.
T. CARNEY.
GRAIN DRILL.
(Application filed Oct. 24, 1900.)
(No Model.) 5 Sheets—Sheet 5.

Witnesses
J. M. Siebler.
Carl Noe.

Thomas Carney,
Inventor
By R. J. McCarty,
his Attorney

UNITED STATES PATENT OFFICE.

THOMAS CARNEY, OF DAYTON, OHIO.

GRAIN-DRILL.

SPECIFICATION forming part of Letters Patent No. 681,037, dated August 20, 1901.

Application filed October 24, 1900. Serial No. 34,141. (No model.)

*To all whom it may concern:*

Be it known that I, THOMAS CARNEY, a citizen of the United States, residing at Dayton, in the county of Montgomery and State of Ohio, have invented certain new and useful Improvements in Grain-Drills; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in grain-drills or seeders.

In various sections of the country, prominently among which may be mentioned the Red River Valley and the great Northwestern wheat belt, considerable trouble has been experienced in the use of grain-drills owing to the sticky or gummy nature of the soil. Drill-shoes placed side by side closer than six inches apart will not prove satisfactory, owing to the great tendency of the soil and the undecayed stubble, straw, &c., to fill up and pack the space between the shoes. The straw, mud, and other substances engaging a shoe cannot be swung off and around the shoe, owing to the adjacent shoes being in such proximity as to prevent a severance of such an accumulation, which increases while the drill is in motion to such an extent that the accumulation becomes larger and larger, and in time becomes a hard-packed mass between the shoes and seriously impedes the operation of the drill. Owing to this great difficulty experienced with drills now commonly in use, it has been found impracticable to place the drill-shoes less than six inches apart.

One of the principal objects of the present invention is to overcome the above objection in an entirely satisfactory manner. This object is accomplished by arranging the drill-shoes in gangs, one gang in the rear of the other. The rear gang contains a shoe for each intervening space between the shoes of the forward gang, and which spaces between the shoes of the forward gang are traversed by the rearward shoes a suitable distance in the rear of said forward shoes. By this arrangement the furrows or drills may be made four inches apart and a suitable space maintained between the respective shoes of each respective gang, so that any clogging of the space between said shoes is avoided.

Another object of the invention is to provide improved feed mechanism, which I will term a "force feed," for the reason that the grain does not depend wholly upon the force of gravity, but is forced mechanically through openings in feed-plates, from which it passes into a series of telescopic feed-tubes and thence into the furrows or grooves formed by the drill-shoes, the feed of grain being at all times positive and uniform.

Another object of my invention is to provide means for covering and pressing the soil firmly on the seed within the furrows. Heretofore drag-chains have been used to cover the seed after depositing, but more or less difficulty has been experienced with this means, owing to the grain being slightly and unevenly covered thereby, the grain depending for its covering upon the earth as said earth falls from the walls of the furrows and the very little additional earth placed thereon by the chains. A covering obtained in this manner offers very little protection from high winds, which have a great tendency to scatter the loose soil. The above objection is overcome in the present invention by the provision of covering-rollers to be used when the soil is drier or is not overmoist and covering-blades to be used when the soil is wet or is affected with excessive moisture. These covering rollers or blades are arranged in gangs and run directly over the grooves or furrows made by the drill-shoes and in which the grain is sown and not only thoroughly cover the grain, but firmly press down the soil on said grain, leaving a substantial layer of pressed earth to protect said grain.

In addition to the objects and advantages outlined above there are other objects and advantages obtainable in the use of my invention, all of which will be more fully described in the following specification, in connection with the accompanying drawings, of which—

Throughout the specification similar reference characters designate corresponding parts in the several views of the drawings.

1 designates the main frame, mounted on axles 2, journaled in the side pieces of said frame and upon which the carrying-wheels 3 are mounted. Within the main frame there are mounted three parallel shafts 4, 5, and 6, the ends of which are firmly journaled in brackets 7, 8, and 9, which are attached at the ends of said frame.

10 designates a horizontal sliding bar which is adapted to move back and forth, as hereinafter described. This bar 10 in such movement will impart an oscillating movement simultaneously to the shafts 4, 5, and 6, to which it is connected by means of the bell-cranks 11, 11$^a$, and 12, which are pivotally connected to said bar 10 and which are rigidly connected to the shafts 4, 5, and 6. The central shaft 5 is connected to a shifting bar 13 by means of a bell-crank 14, one end of which is pivotally connected to said bar 13, and the other end of which is rigidly connected to the shaft 5.

Figure 5:
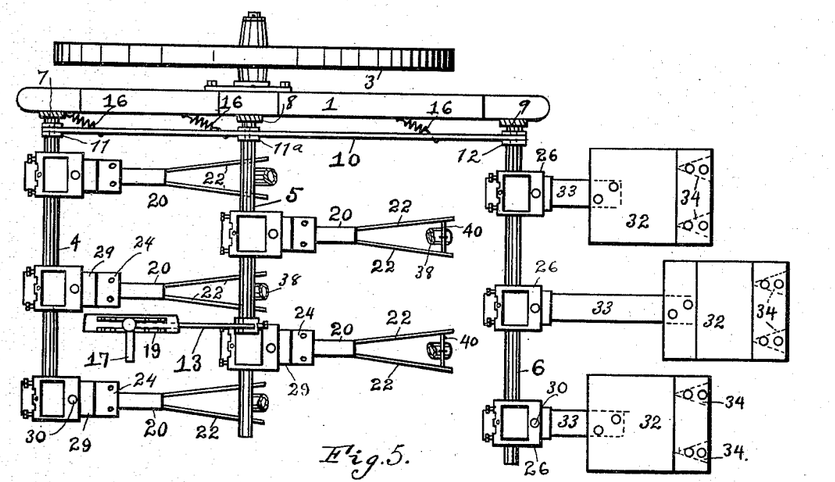
Fig. 5 is a plan view of a portion of the frame, showing the drill-shoes and the covering-blades.

Referring to Fig. 5, the end of the shaft 5 is connected to the sliding bar 10 by a bell-crank 11$^a$, as before stated. Said sliding bar 10 is normally controlled by springs 16. The shifting bar 13 is operated by a hand-lever 17, to which it is connected, said hand-lever having the usual thumb-lever 18, which moves over a toothed segment 19. The shafts 4 and 5 carry two gangs of drill-shoes 20. These drill-shoes are so arranged that the drills or furrows may be four inches apart, or a greater or less space may be provided between the furrows if found necessary. This is an important feature of my invention, as thereby I am enabled to sow seed a proper distance apart in soil that will not permit the furrows or grooves to be cut by shoes placed side by side closer than six inches apart, owing to the nature of such soil.

To provide for this emergency, I arrange the drill-shoes in gangs and place one gang a suitable distance away from and in the rear of the other gang, so that the rearward gang of shoes will cut grooves or furrows between each two of the grooves or furrows cut by the forward gang. The point of attachment of the rearward gang of shoes is approximately on a vertical line with the rear ends of the forward gang of shoes. This removes the rearward gang of shoes entirely away from the forward gang of shoes, so that there cannot possibly be any clogging up of the space between the forward and rearward gangs of shoes. By thus arranging the shoes in gangs the shoes may be much shorter than common, or, in other words, the cutting edges of the shoes may be shortened to approximately a semicircle, so that a great deal of friction due to the contact of the shoes with the soil, stubble, straw, and natural obstructions may be overcome.

Figures 6, 7, 8, 9, 10:
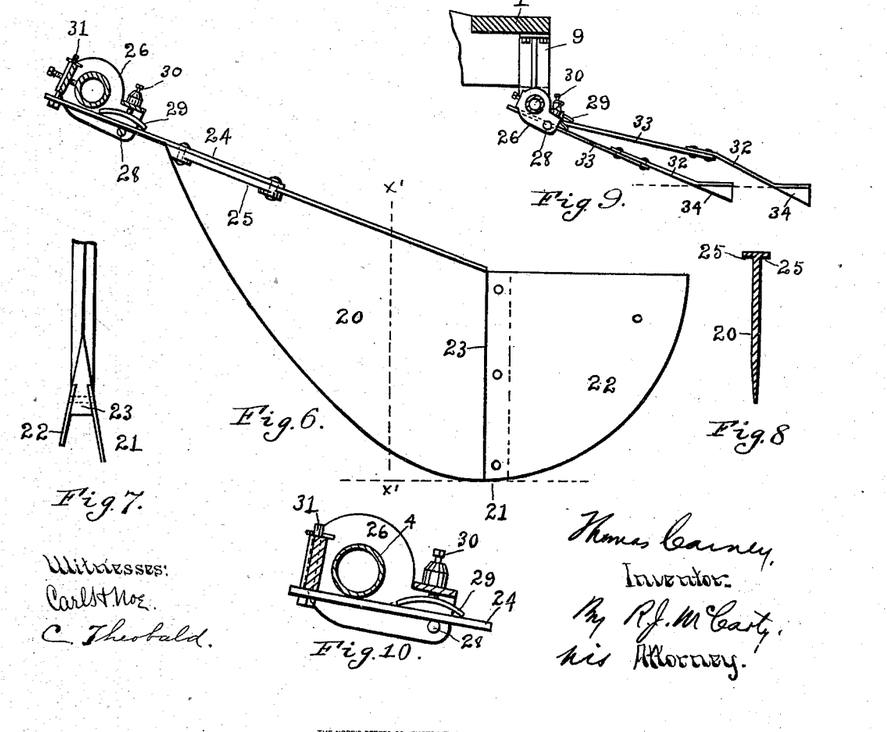
Fig. 6 is an enlarged side elevation of a drill-shoe.
Fig. 7 is a top view of a portion of a drill-shoe.
Fig. 8 is a sectional view of a shoe on the line x' x' of Fig. 6.
Fig. 9 is a partial sectional elevation showing the covering-blades and the manner of their attachment.
Fig. 10 is a sectional view showing the manner of attaching the shoes and the covering-blades to their respective shafts.
Figure 11:
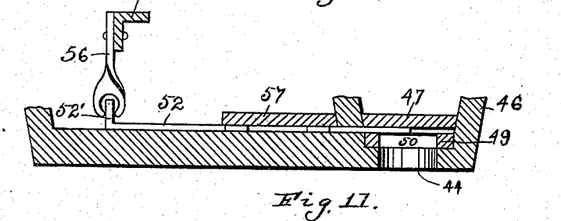
Fig. 11 is a sectional detail showing the manner of attaching the feed slides or cut-offs to their actuating-bar on line a a of Fig. 12.
Figure 12:
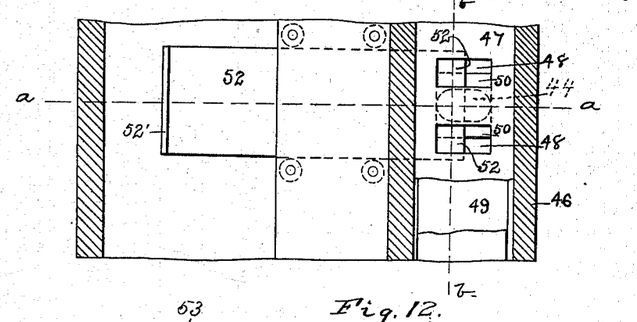
Fig. 12 is a sectional view of a portion of the seed box or hopper and a plan of the feed-plates.
Figure 13:
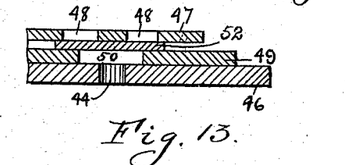
Fig. 13 is a sectional view of the feed-plates on line b b of Fig. 12.
Figure 14:
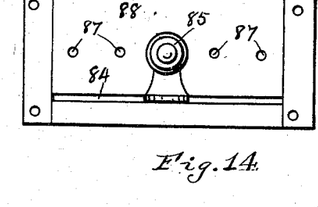
Fig. 14 is an elevation of the means for locking the mechanism through which the vibrating feed-bar is adjusted.

Having described the arrangement of the shoes, I will now describe the particular construction of said shoes. However, I do not desire to limit myself to the precise construction shown and described, as some structural variation may be made without departing from the advantages above referred to. Each of the shoes consists of a body 20, the ground edge of which has a curvature substantially as shown in Fig. 8. The said ground edge, it will be seen, curves gradually toward the ground-point 21, where it assumes a more rounded form, coinciding with the general outline of the side plates 22, which are rigidly secured to the perpendicular edge 23. These side plates 22 spread outwardly from the point of their attachment with the body of the shoe, and between said plates the seed is deposited. Each of said shoes is rigidly attached to its respective shafts 4 and 5 by means of spring-plates 24, which are rigidly secured to the upper flanged edge 25 of the shoe. 26 designates a bracket rigidly secured to the shafts 4 and 5. Between the side walls of each of said brackets there is a rigid pin 28. The plate or bar 24, attached, as before stated, to the shoe, rests upon the upper side of said pin 28. Above said bar 24 there is a curved plate-spring 29, which rests upon the upper side of said bar 24 and is tightened against said bar by a screw 30, which passes through the bracket and presses against the upper side of said plate. 31 is a pin that passes through the bracket 26 and is connected to the end of the plate or bar 24, and thus each shoe is secured to the shafts 4 and 5. While I have particularly described the manner of this attachment of the shoes with their respective shafts, it is evident that other means may be employed for obtaining this connection. Therefore I do not wish to limit myself to the identical manner of connecting the shoes to their respective shafts. Arranged in the rear of the gangs of shoes is a gang of drag or covering blades 32, which follow along in the rear of the drill-shoes and cover each groove or furrow after the seed is placed therein. The brackets 26, by means of which these covering-blades are attached to their shafts 6, are substantially the same in construction as the brackets 26, by which the drill-shoes are attached. These blades are rigidly secured to spring-plates 33, which are passed into their respective brackets 26 over the pins 28 and are held securely in position by the curved spring 29 and screws 30, substantially in the manner that the drill-shoes are secured in their respective brackets and shafts. The pressure upon the covering-blades, as well as the drill-shoes, is regulated by the hand-lever 17. On the lower surface of the straight portion of each of said covering-blades 32 there are two tapering lugs or projections 34, which are rigidly secured thereto. These lugs or projections extend parallel with the blades and are about four inches apart, although the distance may be varied. The length of said lugs or projections is six inches and the depth thereof is about two inches; but these measurements may be varied to suit conditions. The said lugs are sharp and pointed in front and gradually widen and deepen at the rear, as shown in dotted lines in Fig. 5.

Figure 1:
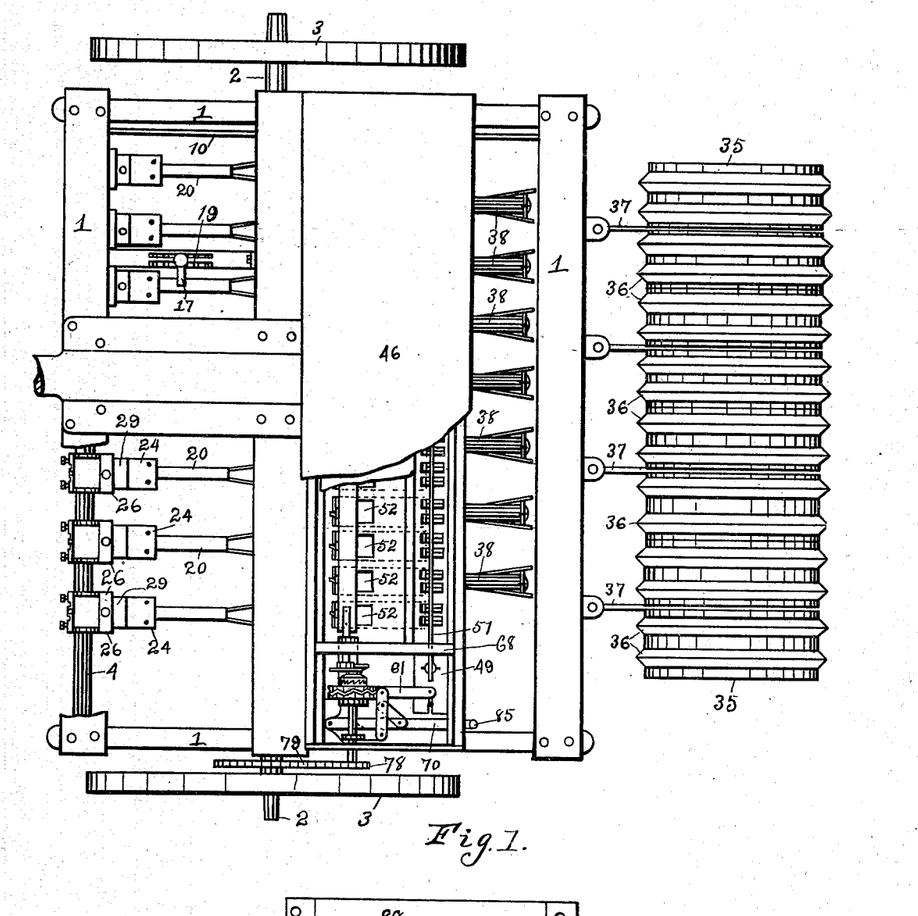
Figure 1 is a top plan view with parts broken away to show the feed mechanism.
Figure 2:
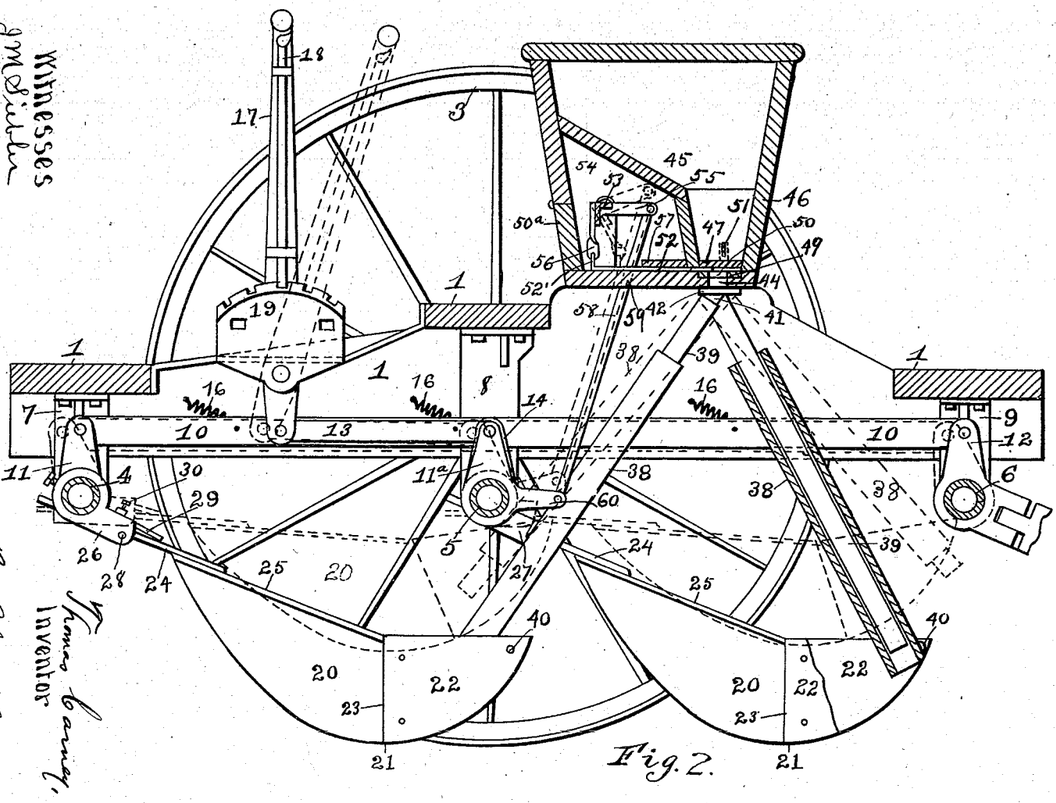
Fig. 2 is a vertical section.

In the movement of the blades 32 they pass on each side of the grooves or furrows and cover the grain in a substantial manner, pressing the earth down firmly thereon. The covering is done from each side of the grooves toward the centers thereof, and the projections 34 leave small grooves on each side of the grain-bed, which serve as receptacles for rain, moisture, dust, &c. The projections 34, as before stated, gradually increase both in width and in depth as they extend backward. Owing to this peculiar shape of these parts, when the covering-blades are in motion the soil packs from its original shape from each side of the groove or furrow upon and over said groove or furrow to a distance of about two and one-half inches, and by the combined downward pressure of the blades and the side pressure, due to the projections 34, the soil over the grooves or furrows will become securely packed over the grain. As hereinbefore stated, these covering-blades are adapted to be used where the soil is sticky or gummy. In cases where the soil is not of this character, but is of a drier nature, and therefore might require greater pressure, the covering-blades 32 may be substituted by a series of rolling-colters or covering-wheels 35. (Shown in Fig. 3.) The peripheries of these covering-wheels are provided with annular projections 36, which are of a V shape in cross-section. These annular projections 36 perform the functions of the projections 34 described in connection with the covering-blades 32. There are two of such annular projections 36 on each of said wheels, and in passing over the grooves or furrows such annular projections press the earth inwardly and compactly over the grain similar to the lugs 34 on the blades 32. Each pair of said wheels is mounted on a common shaft side by side, and which shaft is coupled to the shaft 6 by means of a drag-bar 37, as shown in Fig. 2.

By the means employed for attaching the drill-shoes and the covering-blades I am enabled to dispense with the usual irons, braces, springs, straps, &c., usually impeding a free and easy movement of a grain-drill.

From the foregoing description of the drill-shoes and the covering-blades 32 it will be observed that the entire gangs are lowered and raised by a single operating-lever, said operating-lever effecting such movements through the shifting bars 13 and 10. By the accomplishment of these movements of the gangs from a single point of operation I have overcome the necessity of using numerous bars, braces, and other connections.

I will next describe the feed mechanism.

38 and 39 designate telescopic feed-tubes for each drill-shoe. The outer one of said feed-tubes is attached between the plates 22 by means of pins 40, that are secured between said side plates. The inner one of said feed-tubes fits over the nozzle 41, which projects from a plate 42, which is secured to the lower side of the seedbox 46. (See Fig. 2.) These plates 42 have openings in them which are below similar openings 44 in the bottom of the seed-hopper 46. (Shown in Figs. 4 to 14.) The inner tubes act as cleaners to force any dirt out of the lower ends of the outer tubes and out of the space between the sides of the shoes. The inner tubes perform this function whenever the gangs are elevated, which movement elevates the outer tubes and permits the inner tubes to project through the lower end of said outer tubes. The seedbox 46 is divided longitudinally by a wall 45, which directs the seed into the hopper-compartment 46. In said bottom there is placed throughout the entire length a stationary bar or plate 47 with openings 48, which occupy positions above and on each side of the openings 44 in the bottom of the hopper. Between the bottom of the hopper and the bar or plate 47 there is a vibrating plate or bar 49, in which there is a series of grain-openings 50, which register with the openings 48 in the stationary plate 47 and with the openings 44 in the bottom of the hopper and receive grain through the openings 48 and force it laterally into the openings 44. The vibration of said bar 49 forces the grain from both sides of the openings 50 into the openings 44 immediately over the telescopic tubes. Attached to the plate 49 and extending the length thereof and occupying a position some distance from the upper surface of said plate 49 there is an agitating-bar 51, which serves to agitate the grain in the hopper as the plate 49 is vibrated. There is some space between the bottom of the grain-hopper and the bar or plate 47. Movable in and out of this space are a series of slides or cut-offs 52, which are shiftable back and forth to cut off the feed of grain, which they do by passing between the openings 50 and 48. Movement is imparted to these slides or cut-offs 52 through the following devices: 53 designates a horizontal oscillating bar which is mounted in the space 54 in the feed-box. This bar extends the full length of the feed-box and has its ends journaled in bearings in the ends of said feed-box. Rigidly connected to said bar 53, at a point near the middle thereof, is a bell-crank 55 and a series of connecting-arms 56, which are detachably connected to the slides or cut-offs 52. Owing to the connecting-arms 56 being detachable from the slides 52, the feed may be limited to a greater or less number of openings 44, wherever conditions may require it. The slides are inclosed by guides 57, which maintain them in a proper sliding position. Pivotally connected to the bell-crank 55 is a rod 58, which passes through a suitable opening 59 in the bottom of the seedbox and has a pivotal connection with a bell-crank 60, which is rigidly attached to the shaft 5. Should it be desirable to sow grain in any number less than the full number of drills, this may be done by detaching the connecting-arms 56 from those slides or cut-offs 52 which it is desired shall remain inoperative or in a position to prevent grain from passing through their respective openings 44. The connecting-arms 56 are pivoted to the bar 53 and have their lower ends bifurcated to fit over the upturned end 52' of the slides 52. Therefore said connections 56 are easily detached from the slides 52. The rear of the seedbox has a lid 50ª, through which access is had to the slide connections 56.

By the connection between the oscillating bar 53 and the shaft 5 it will be seen that upon each movement of the gangs through the shifting bars 13 and 10 the feed-slides or cut-offs 52 will be correspondingly moved either to entirely shut off the grain, which is done when the gangs are elevated to the dotted positions shown in Fig. 2, or to entirely uncover the grain-openings, which is the case when the gangs are forced into the soil.

Longitudinal reciprocating movement is imparted to the vibrating bar 49 by the following mechanism: 61 is a bar having a pivotal connection at 62 with the end of the bar 49. The said bar 61 has a curved cam-slot 63 therein, in which the lug 64 projects from a link-bar 65, said link-bar having a pivotal connection at 66 with a stationary bracket 67, mounted within the space partitioned off by a wall 68, which wall, together with a guide-pin 69, provides guides for the vibrating bar 49. The link connection 65 is connected to a feed-regulating bar 70 by means of a link 71. The bar 61 has projected upwardly a pin or lug 72, which is shown in dotted lines in Fig. 3. This pin 72 projects into a cam-slot 73, which is in the periphery of a wheel 74, said wheel 74 being rigid to or an integral part of a clutch member 75, which is mounted on shaft 76 and driven through a chain-wheel 78 and chain 79 from an axle of one of the carrying-wheels. The other member 75' of the clutch is also mounted on shaft 76 and turns at all times with said shaft; but clutch member 75 is loose on said shaft and does not turn therewith only when the clutches are engaged.

Figure 3:
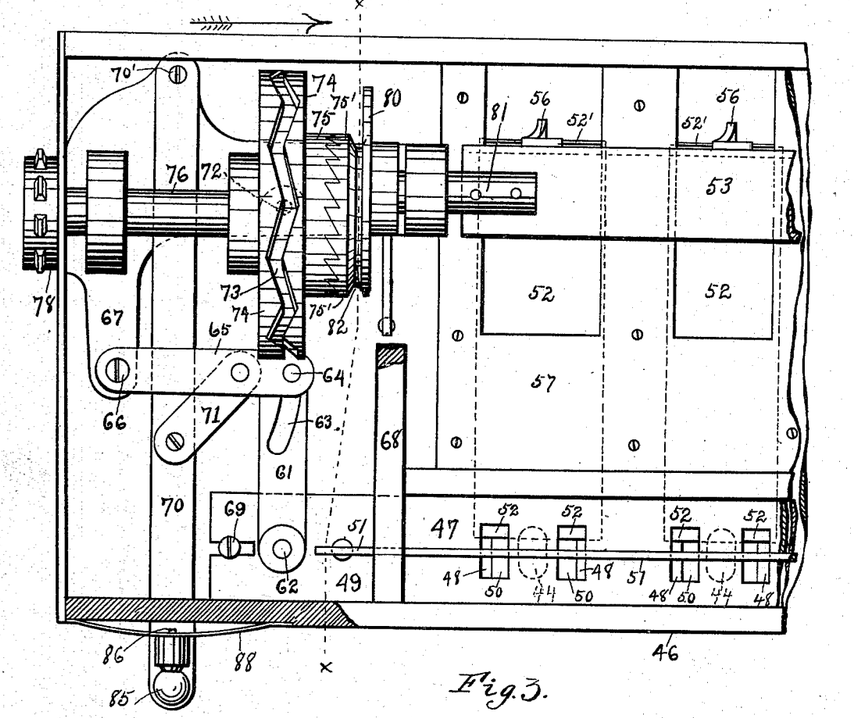
Fig. 3 is an enlarged top plan view of an end of the feed-box, showing the actuating mechanism for the feed mechanism.
Figure 4:
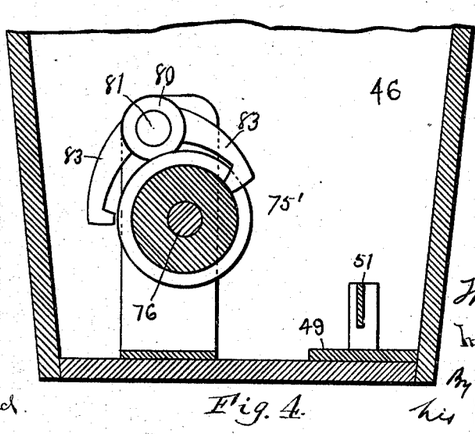
Fig. 4 is a sectional view on the line x x of Fig. 3.

Engagement and disengagement of the clutch members are effected through a shifter 80, which is rigidly mounted on one of the end shafts 81 of the bar 53, as shown in Fig. 3. The peripheral groove 82 of the clutch member 75' has two tapering sides. The arms 83 of the shifter 80 project inwardly, and under the oscillating movement which is imparted to the bar 53 the arms 83 of the shifter 80 move against one or the other tapering sides of the groove 82 and will shift the clutch member 75' either away from engagement with the clutch member 75 or into engagement with said clutch member 75. If the movement imparted to the bar 53 is such that will move the slides 52 away from the feed-openings 44 and 50, such movement of the bar 53 will move the clutch-shifter 80 to engage with the clutch member 75' to move it in engagement with the clutch member 75, and vice versa. When the clutch members are thus engaged, the wheel 74 will rotate, causing the lever 61 to vibrate through contact of the pin 72 with the cam-groove 73. The vibratory movement of the bar 61 will impart similar vibratory movement to the seed-bar 49. The extent of this movement of the bar 61 may be regulated through the pivotal bar 70, whose connection is at 70' on the bracket 67.

As before stated, the bar 61 is connected to the bar 70 through links 65 and 71. Bar 70 projects through a slot 84 in the front of the seedbox and has extended upwardly from said end a finger-piece 85, which has a spring-controlled pin 86, which is adapted to enter any of the openings 87 in a curved metal scale-plate 88, which is attached to the outer side of the seedbox. The lever 70 may be shifted in an arc movement and locked in any position within the radius of such movement by the pin 86 being allowed to enter the adjacent opening 87.

Referring to Fig. 3, when the lever 70 is moved to the left to the limit the least movement is imparted to the seed-bar 49, and when said lever 70 is moved to the right to the limit the greatest movement will be imparted to the seed-bar 49. It will be understood that any intermediate movement between the two extreme movements above indicated may be given the seed-bar from the smallest possible feed to the full capacity of the seed-openings.

It will be understood that the pivot 64 forms a changeable fulcrum of the bar 61. As the pivot 64 is shown in Fig. 3 the fulcrum of said bar is about midway of the slot 63. The movements of the bar 70 which will bring the pivot 64 in either extreme end of the slot 63 will change the fulcrum of bar 61 in a manner that will be readily understood. When the fulcrum 64 is in the end of the slot 63 that is nearest the pivotal point 62 of the feed-plate 49, the movement imparted to the bar 61 will be the shortest.

Having described my invention, I claim—

1. In a grain-drill or seeder, the combination with a frame, of two gangs of drill-shoes mounted therein, one of said gangs being in the rear of the other and adapted to cut furrows within the space between the furrows cut by the forward gang, the point of attachment of the shoes of the rearward gang being approximately in a vertical line with the rearward ends of the shoes of the forward gang so that no portion of the shoes of the rearward gang will be in line with the shoes of the forward gang, a common operative means for simultaneously raising or lowering the said gangs, and connecting mechanism between the gangs by means of which the said simultaneous movements are effected.

2. In a grain-drill or seeder, the combination with a frame, gangs of drill-shoes mounted therein, the rearward gangs of said drill-shoes being arranged to cut furrows within the space between the furrows cut by the forward gang, the point of attachment of the shoes of the rearward gang being approximately in a vertical line with the rearward ends of the shoes of the forward gang so that no portion of the shoes of the rearward gang will be in line with the shoes of the forward gang, a common pivotal connection between said gangs, an operating-lever, and a connection between said operating-lever and said gangs whereby the gangs may be operated simultaneously from said operating-lever, to raise or lower them.

3. In a grain-drill or seeder, the combination with a frame, of gangs of drill-shoes mounted in said frame, the rearward gang being arranged to cut furrows between the furrows cut by the forward gang, a gang of furrow-coverers consisting of blades arranged in the rear of the rearward gang of drill-shoes and adapted to cover the furrows cut by both gangs of drill-shoes, an operating-lever common to said gangs, and connections between said operating-lever and said gangs whereby the said gangs may be elevated or lowered simultaneously.

4. In a grain-drill or seeder, the combination with a frame, of gangs of drill-shoes, the rearward gang being arranged to cut furrows or drills between the furrows or drills cut by the forward gang, a gang of covering-blades arranged in the rear of the rearward gang of drill-shoes, the said covering-blades being adapted to cover the furrows made by both gangs of shoes from each side and to leave a depression on each side of each furrow, a common connection between said gangs, an operating-lever, and connecting mechanism between said operating-lever and said gangs whereby the gangs may be simultaneously elevated or lowered.

5. In a grain-drill or seeder, the combination with gangs of drill-shoes, the shoes of the rearward gang being arranged to cut furrows or drills between the furrows or drills cut by the forward gang, a reciprocating bar to which said gangs are connected, an operating-lever common to said gangs, a connection between said operating-lever and said gangs, and a series of telescopic feed-tubes connected to said drill-shoes.

6. In a grain-drill or seeder, the combination with a frame, of gangs of drill-shoes mounted therein, the rearward gang being arranged to cut furrows between the furrows cut by the forward gang, a gang of covering-blades arranged in the rear of the rearward gang of drill-shoes and adapted to cover the furrows made by both gangs of drill-shoes, a reciprocating bar connecting said gangs, an operating-lever common to all of said gangs, a connecting-bar through which movement is transmitted to said gangs simultaneously, and a series of telescopic feed-tubes adapted to deliver seed to the furrows.

7. In a grain-drill, the combination of drill-shoes, a series of telescopic feed-tubes connected to said drill-shoes, a seed-receptacle with openings therein below which said telescopic tubes are connected, a stationary bar arranged above the openings within the seed-receptacle and having two seed-openings therein for each opening in the seed-receptacle, a vibrating plate or bar movable between the openings in the seed-receptacle and the said stationary bar, the said vibrating feed-bar having openings therein which receive the seed or grain from the openings in the stationary bar, and from which the seed or grain is forced laterally into the openings in the bottom of the seed-receptacle during both movements of said vibrating bar.

8. In a grain-drill or seeder, the combination of drill-shoes arranged in gangs, a series of telescopic feed-tubes connected to said shoes, a seed box or hopper having openings in the bottom thereof below which the said telescopic feed-tubes are connected, a stationary feed-plate having openings therein and arranged above the openings in the seedbox, a vibrating feed-bar arranged to move back and forth between the openings in the seedbox and the openings in the stationary feed-plate, the said vibrating feed-bar having openings therein which receive the grain through the openings in the stationary feed-plate and from which the grain is forced laterally into the openings in the grain-box during both movements of said vibrating feed-bar, a series of sliding plates or cut-offs movable between the openings in the said stationary feed-plate and the openings in the vibrating bar, and means for simultaneously sliding said plates or cut-offs to control the feed of grain.

9. In a grain-drill or seeder, the combination with drill-shoes, of a series of telescopic feed-tubes connected to said drill-shoes, a seed box or hopper having openings in the bottom thereof below which the telescopic feed-tubes are connected, a stationary plate having a series of openings therein which occupy positions above the openings in the seedbox, a vibrating feed-bar movable longitudinally between the openings in the bottom of the seedbox and the openings in the stationary feed-plate, the said vibrating feed-bar having openings therein which register with the openings in the bottom of the seedbox and with the openings in the stationary feed-plate, the openings in said vibrating feed-bar being adapted to receive the grain through the openings in the stationary feed-plate and to force said grain laterally into the openings in the bottom of the seedbox during both movements of said feed-bar, and means for varying the movements of said vibrating feed-bar whereby the discharge of grain into the openings in the bottom of the seedbox may be regulated.

10. In a grain-drill or seeder, the combination with drill-shoes, of a series of telescopic feed-tubes connected to said drill-shoes, a seed box or hopper having grain-openings in the bottom thereof below which the telescopic feed-tubes are connected, a stationary feed-plate having two openings therein arranged above each opening in the bottom of the seedbox, a vibrating feed-bar with openings therein to receive the grain and force it into the openings in the bottom of the seedbox, means for regulating the movements of said vibrating feed-bar, a series of slides or cut-offs movable between the stationary feed-plate and the vibrating feed-bar to cut off the discharge of grain, and means for shifting said slides or cut-offs to close or open the feed-openings.

11. In a grain-drill or seeder, the combination with a seed box or hopper, having a series of grain-openings therein, of a series of telescopic feed-tubes arranged below the openings in said seedbox, a stationary feed-plate with openings therein arranged above the openings in the seedbox, a vibrating feed-plate movable between the openings in said feed-plate and the openings in the seedbox, a series of slides or cut-offs adapted to cut off the feed of grain through said openings, an oscillating bar, connecting-arms between said oscillating bar and said slides or cut-offs, and means for operating said oscillating bar to simultaneously move the slides or cut-offs to open or close the grain-openings.

12. In a grain-drill or seeder, the combination of gangs of drill-shoes, a connection between said gangs, a series of telescopic feed-tubes connected to the drill-shoes, a seed box or hopper with openings therein below which the said telescopic feed-tubes are connected, a series of slides or cut-offs arranged above the openings in said feed-box, an oscillating bar to which said slides or cut-offs are connected, a connection between said oscillating bar and the gangs of drill-shoes, and means for actuating the gangs of drill-shoes and the said oscillating bar to simultaneously elevate the drill-shoes and to cut off the feed of grain to the telescopic tubes, or to lower the drill-shoes and permit the feed of grain to said telescopic feed-tubes.

In testimony whereof I affix my signature in presence of two witnesses.

THOMAS CARNEY.

Witnesses:
R. J. McCARTY,
C. THEOBALD.